US012677173B2

(12) United States Patent
Mullings et al.

(10) Patent No.: US 12,677,173 B2
(45) Date of Patent: *Jul. 7, 2026

(54) SYSTEM AND METHOD FOR AUTOMATIC EMERGENCY CALL VALIDATION

(71) Applicant: AT&T Mobility II LLC, Atlanta, GA (US)

(72) Inventors: Craig Mullings, Loxahatchee, FL (US); Stalin Fernando Albanes, Atlanta, GA (US); Chhavi Sharma, Plano, TX (US); Justin Kenneth Kirsten, Estero, FL (US)

(73) Assignee: AT&T MOBILITY II LLC, Atlanta, GA (US)

( * ) Notice: Subject to any disclaimer, the term of this patent is extended or adjusted under 35 U.S.C. 154(b) by 338 days.

This patent is subject to a terminal disclaimer.

(21) Appl. No.: 18/172,524

(22) Filed: Feb. 22, 2023

(65) Prior Publication Data

US 2023/0199540 A1 Jun. 22, 2023

Related U.S. Application Data

(63) Continuation of application No. 17/021,737, filed on Sep. 15, 2020, now Pat. No. 11,611,894.

(51) Int. Cl.
H04W 24/08 (2009.01)
G01C 21/36 (2006.01)
(Continued)

(52) U.S. Cl.
CPC .......... *H04W 24/08* (2013.01); *G01C 21/362* (2013.01); *G06Q 10/06395* (2013.01); *G06Q 10/107* (2013.01); *G06Q 10/109* (2013.01);

*G06Q 30/018* (2013.01); *G06Q 50/265* (2013.01); *H04W 4/40* (2018.02); *H04W 4/90* (2018.02);
(Continued)

(58) Field of Classification Search
CPC ......... H04W 24/08; H04W 4/40; H04W 4/90; H04W 28/16; H04W 84/042; H04W 88/08; H04W 88/18; H04W 4/025; G01C 21/362; G06Q 10/06395; G06Q 10/107; G06Q 10/109; G06Q 30/018; G06Q 50/265

See application file for complete search history.

(56) References Cited

U.S. PATENT DOCUMENTS 10,791,221 B1 * 9/2020 Vislocky .............. H04M 3/5116
11,089,156 B1 * 8/2021 Luo ........................ H04W 76/50
(Continued)

*Primary Examiner* — Marcus Hammonds
(74) *Attorney, Agent, or Firm* — Guntin & Gust, PLC; Mark Wilinski

(57) ABSTRACT

A method includes generating a test call from a user device to a public safety access point, wherein the test call is generated on a schedule, wherein the test call is configured to test call parameters, and wherein the test call parameters comprise a planned base station site and a planned base station sector, acquiring call detail data associated with the test call, in which the call detail data includes an identification of an actual base station site and an actual base station sector used for the test call and the public safety access point receiving the test call, and wherein the actual base station site collects the call detail data, determining whether the call detail data matches the test call parameters, and generating a pass or fail determination based on the determining step.

20 Claims, 15 Drawing Sheets

(51) Int. Cl.

| | |
|---|---|
| *G06Q 10/0639* | (2023.01) |
| *G06Q 10/107* | (2023.01) |
| *G06Q 10/109* | (2023.01) |
| *G06Q 30/018* | (2023.01) |
| *G06Q 50/26* | (2012.01) |
| *H04W 4/40* | (2018.01) |
| *H04W 4/90* | (2018.01) |
| *H04W 28/16* | (2009.01) |
| *H04W 84/04* | (2009.01) |
| *H04W 88/08* | (2009.01) |

(52) U.S. Cl.
CPC .......... *H04W 28/16* (2013.01); *H04W 84/042* (2013.01); *H04W 88/08* (2013.01)

(56) References Cited

U.S. PATENT DOCUMENTS

| | | | |
|---|---|---|---|
| 2009/0305722 A1* | 12/2009 | Tiedeman ............... | H04W 4/20 |
| | | | 455/456.1 |
| 2021/0289416 A1* | 9/2021 | Shurtz ................... | H04W 24/06 |
| 2022/0086667 A1 | 3/2022 | Mullings et al. | |

* cited by examiner

FIG. 1b

System Schedule Events GUI

➢ Flexible report delivery options

➢ Testing tied to a project name and a coordinator

➢ Scheduling & sector validation listing

FIG. 4b

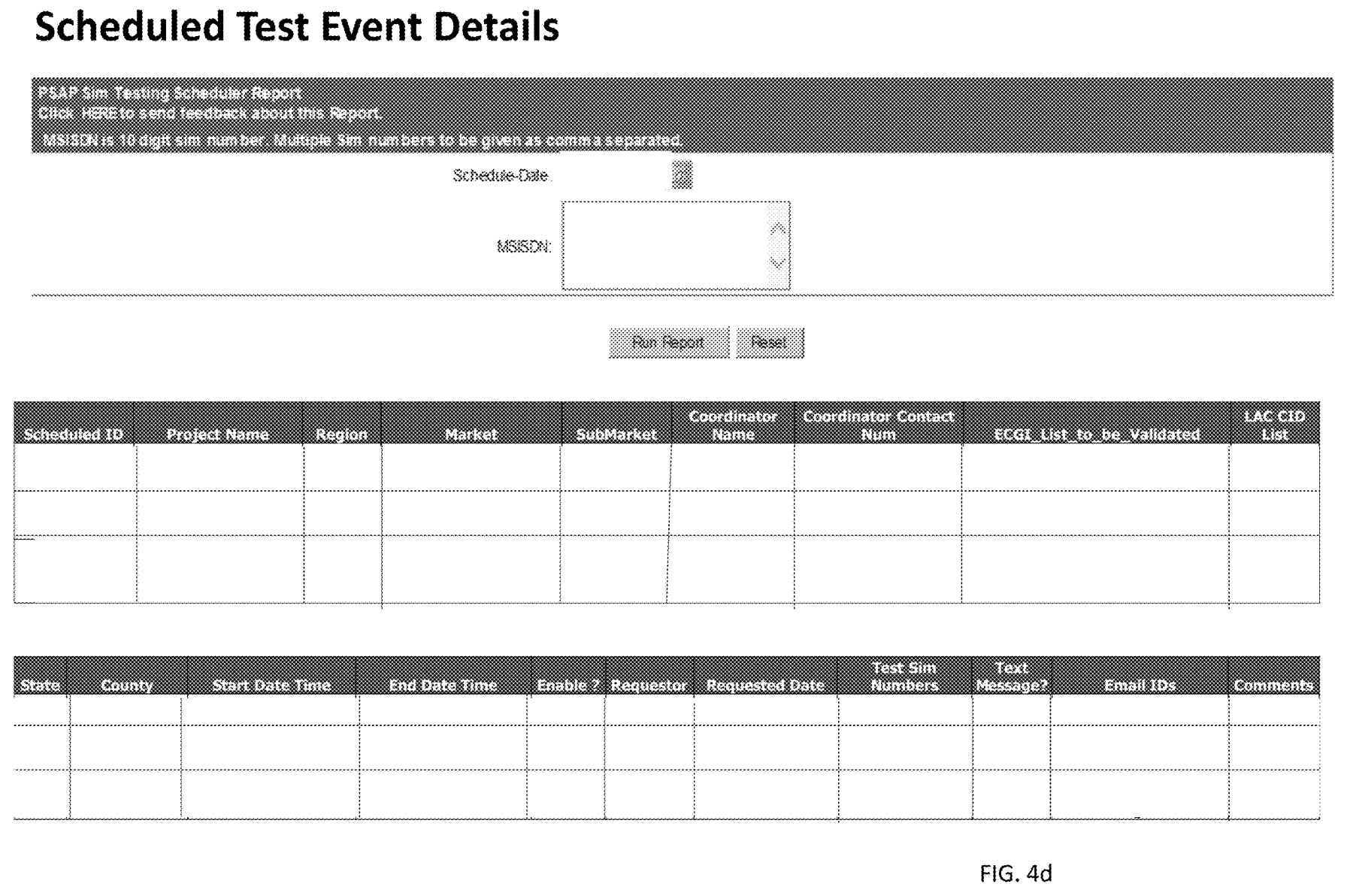

Scheduled Test Event Details

RUP Sim Testing Scheduler Report
Clink HERE to send feedback about this Report
MSISDN is 10 digit sim number per Multiple Sim numbers to be given as comma separated.

Schedule Date:

MSISDN:

Print Report     Reset

| Scheduled ID | Project Name | Region | Market | SubMarket | Coordinator Name | Coordinator Contact Num | ECGI List to be Validated | LAC CID List |
|---|---|---|---|---|---|---|---|---|
| | | | | | | | | |
| | | | | | | | | |
| | | | | | | | | |

| State | County | Start Date Time | End Date Time | Enable ? | Requestor | Requested Date | Test Sim Numbers | Text Message? | Email IDs | Comments |
|---|---|---|---|---|---|---|---|---|---|---|
| | | | | | | | | | | |
| | | | | | | | | | | |
| | | | | | | | | | | |

FIG. 4d

Rollup Summary Report

| SCHEDULE ID | Date & Time | PROJECT NAME | COORDINATORS NAME | Validations | Sector Count | Passing | Failed | Not Tested |
|---|---|---|---|---|---|---|---|---|
| | | | | Pending | 10 | 0 | 0 | 10 |
| | | | | Pending | 9 | 0 | 0 | 9 |
| | | | | PASS | 4 | 4 | 0 | 0 |
| | | | | PASS | 3 | 3 | 0 | 0 |

| ECGI or CGI List | USED | VALIDATION RESULTS |
|---|---|---|
| 1 | | PASSED |
| 2 | | PASSED |
| 3 | | PASSED |
| 4 | | PASSED |

SYSTEM AND METHOD FOR AUTOMATIC EMERGENCY CALL VALIDATION

CROSS-REFERENCE TO RELATED APPLICATION(S)

The present application is a continuation of U.S. patent application Ser. No. 17/021,737, filed Sep. 15, 2020. All sections of the aforementioned application(s) and/or patent(s) are incorporated herein by reference in their entirety.

TECHNICAL FIELD

This disclosure is directed to systems and methods for automatically testing and validating calls to public safety access points.

BACKGROUND

Traditionally E911 call validation is a manual process that requires an E911 subject matter expert to be engaged to determine the outcome via a ticket that often carries a five-day turn-around time as part of a traditional service level agreement. This delay is unreasonable as bringing public service access points on-line with new cellular equipment is mission critical. Accordingly, there is a need to develop a new and cost-effective system and method which automates the call validation process for E-911 systems.

SUMMARY

The present disclosure is directed to an emergency test call management system including a cellular network in communication with a public safety access point, wherein the cellular network has a base station having a plurality of sectors, a testing device in communication with the cellular network, and a server in communication with the cellular network, the server having an input-output interface, and a processor coupled to the input-output interface wherein the processor is further coupled to a memory, the memory having stored thereon executable instructions that when executed by the processor cause the processor to effectuate operations including receiving, through a user interface, a call schedule and test parameters for a test call configured for testing connectivity between the public safety access point and the cellular network, wherein the input test parameters include one of the plurality of sectors to be tested, receiving test data from the base station at the conclusion of the test call, evaluating test data based on the test parameters, and generating a report based on the evaluating step. The test parameters include a specified base station and a specified cell sector within the base station and wherein the evaluating step compares an actual base station and an actual cell sector that carried the test call to the specified base station and the specified cell sector and the test parameters further include a routing path to the public safety access point. In an aspect, the operations further include causing the test call to be initiated and retrieving location data for the test call and confirming that the location data was reported to the public safety access point. In an aspect, the testing device is associated with a vehicle and wherein the operations further include providing driving instructions for the vehicle.

The disclosure is also directed to a method including generating a test call from a user device to a public safety access point, wherein the test call is generated on a schedule, wherein the test call is configured to test call parameters, and wherein the test call parameters include a planned base station site and a planned base station sector, acquiring call detail data associated with the test call, in which the call detail data includes an identification of an actual base station site and an actual base station sector used for the test call and the public safety access point receiving the test call, and wherein the actual base station site collects the call detail data, determining whether the call detail data matches the test call parameters, and generating a pass or fail determination based on the determining step. The test parameters may further include a frequency band for the test call and wherein the generating step is also dependent on the frequency band matching an actual frequency band used in the test call. The test parameters may further include an emergency class of service for the test call and wherein the generating step is also dependent on the emergency class of service matching an actual emergency class of service. The method may further include determining whether a location of the test call was reported to the public safety access point. In an aspect, the location of the test call was determined within an acceptable range. The pass or fail determination may be sent via one of a text message or email.

The disclosure is also directed to a computer readable medium storing computer program instructions, which, when executed on a processor of a processor and memory environment, cause the processor to perform operations including causing a test call to be placed from a user device to a public safety access point, wherein the test call is generated on a schedule, wherein the test call is configured to test call parameters, and wherein the test call parameters include a planned base station site and a planned base station sector, acquiring call detail data associated with the test call, in which the call detail data includes an identification of an actual base station site and an actual base station sector used for the test call and the public safety access point receiving the test call, and wherein the actual base station site collects the call detail data, determining whether the call detail data matches the test call parameters, and generating a pass or fail determination based on the determining step. The operations further include receiving from a user interface, scheduling data and the test call parameters relating to the test call. The operations may further include generating a user interface wherein the user interface includes a scheduling component, a call detail report component, and a validation component and wherein the validation component is color-coded to indicate the pass or fail determination visually. The operations may further include scheduling a plurality of test calls, receiving, from a user interface, scheduling data for the plurality of test calls, test call parameters relating to each of the plurality of test calls, and drive test support for each of the plurality of test calls. The operations may include generating validation results and transmitting the validation results to the user interface and wherein the pass-fail determination is conveyed via a text message or an email communication. In an aspect, the operations may further include generating a roll-up report containing the validation results for the plurality of test calls.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 1B illustrates an exemplary functional block diagram of the validate test server of FIG. 1*a*.

FIG. 4*b* illustrates an exemplary screen shot entitled Validation Results—Call Detail Report.

FIG. 4*d* illustrates an exemplary screen shot of a scheduled test event detail.

DETAILED DESCRIPTION OF ILLUSTRATIVE EMBODIMENTS

System Overview. This disclosure is directed to a system and method that reduces the deployment cycle-time for new cell sites by multiple days while enabling anyone with system access to schedule test events using future dates and to assimilate test data in real time or near real time to validate the test results. As such, the system and method of the present disclosure provides a practical application by eliminating the need for an E911 subject matter experts to perform manual validations while at the same time simplifying test results for non-technical personnel.

Automated validation may be performed at any time of the day or week. The system may support scheduling call events for test and evaluation in advance, which may, for example, range from 24-hours in advance up to 30-days in advance. Once the tests are run, data may be retained including the validated results of all sites requiring call testing. The system may work with a public safety access point (PSAP) simulator and may support live PSAP call testing.

The process involves validating that the voice and data path of test E911 calls are consistent with a working cell site sector routing to a PSAP. The process includes confirming that test calls are originating from the correct sector carrier being deployed. The process may further involve validating the E911 Phase 1 & 2 response resulting from each call. There may be a built-in rule set to determine and then clearly communicates pass/fail of the tests to the project team via text and e-mail so they can move forward with their deployment.

The system and method of the present disclosure may provide an automated post processed response in a relatively short time period. Accordingly, the deployment cycle for new cell site sectors may be accelerated, often decreasing that deployment cycle by up to five days. The system may also include an historical database in which records of validation tests and the results thereof may be stored.

Figure 1A:
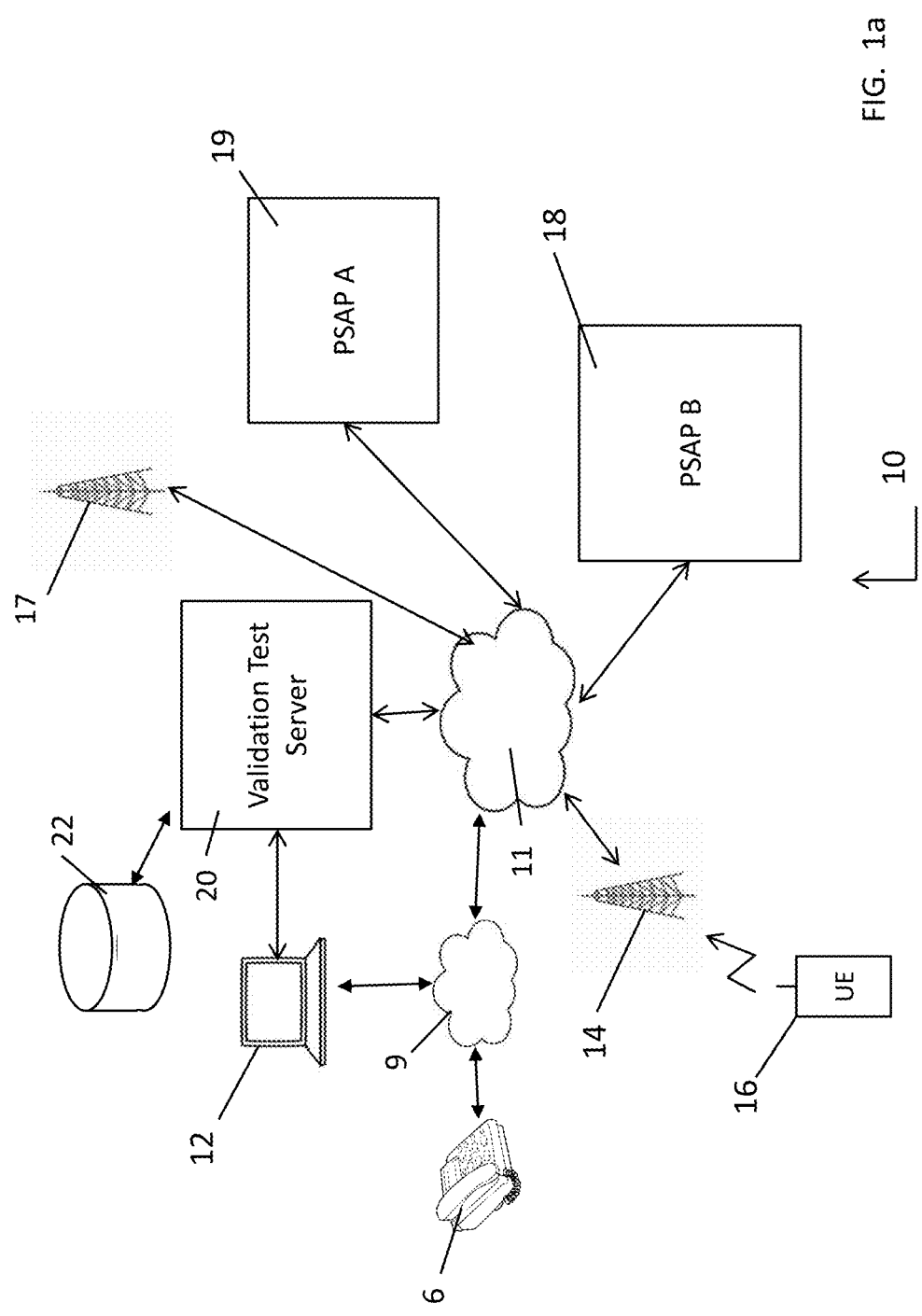
FIG. 1*a* illustrates an exemplary operating environment of the present disclosure.

Operating Environment. With reference to FIG. 1, there is shown an exemplary system 10 in accordance with the present disclosure. The system 10 has a network 11. The disclosure is applicable to any type of network 11, including but not limited to any type of wireless communication network, including 3G, fourth generation (4G)/LTE, fifth generation (5G), and any other wireless communication network, a public switched telephone network ("PSTN"), a wide-area local area network ("WLAN") and may, for example include virtual private network ("VPN") access points, Wi-Fi access points, and any other access points capable of interfacing with the network 11. It will be understood by those skilled in the art that while the network 11 may comprise the afore-mentioned networks, a combination of one or more communication networks may be used. For illustrative purposes only, subnetwork 9 is shown as an example of a PSTN network interfacing with network 11.

Also shown in FIG. 1 are input devices such as workstation 12 in communication with subnetwork 9 which alternatively be in communication with network 11. Also shown is a mobile user equipment 16 such as a smart phone, tablet, PDA or other portable user device, in communication with network 11 via a cellular or other wireless system, represented by cell towers 14, 17.

There is shown a validation test server 20 in communication with workstation 12, either directly or through network 11. The validation test server 20 may be configured to host the validation tool described in detail herein. The workstation 12 may provide client access to validation test server 20, including a user interface as described in more detail herein.

Also shown are PSAP A 19 and PSAP B 18. In this exemplary configuration, it is assumed that mobile calls made using cell tower 14 would be routed to PSAP B 18, while mobile calls made using cell tower 17 would be routed to PSAP A 19 as they are closest in proximity to each other.

Figure 1B:
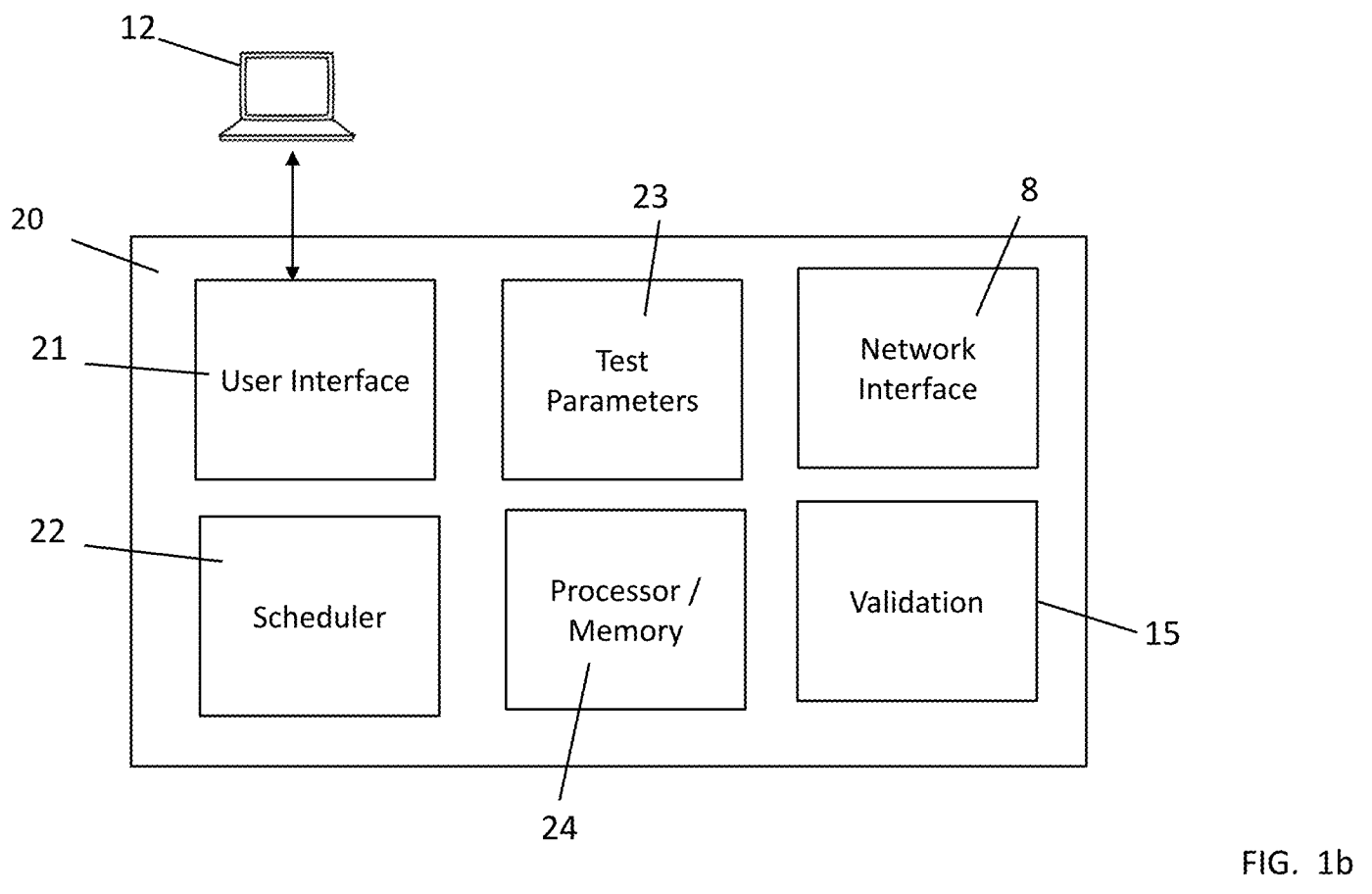

With reference to FIG. 1B, there is shown an exemplary functional block diagram of validation tool server 20. It will be understood that the interconnection between the exemplary functions, while not shown, exist such that any of the exemplary functions may be in communication with any other exemplary functions. Shown is user interface 21 in communication with workstation 12. In a client-server architecture, a software application client may reside on workstation 12. In a cloud-based application, the workstation 12 may log-in using credentials and access the functionality of the validation tool server 20 residing thereon. A scheduler 22 schedules tests, modifies test schedules, and tracks test schedules from the time they are entered in the validation tool server 20. The test schedule may originally be entered through workstation 12. In an embodiment, the test schedule may be obtained from the network or from an external server whenever a new cell site and/or cell sector is scheduled to be deployed. The test parameter function 23 may contain a list of network parameters and functionality which need to be tested and validated prior to a new cell site and/or cell sector comes on-line. The validation function 15 will compare the test results to the test parameters and determine whether each of the individual test parameters was successfully validation and based on that comparison, determine the pass/fail status of the test. A network interface 8 is shown to communicate with network 11. The network interface 8 may communicate with network functions to receive call detail records from the various test calls, to cause the test calls to be placed, and to access other network functions that may be used as part of the testing protocols. The methods described herein may be implemented by a processor executing instructions stored in memory, shown in this exemplary functional block diagram as processor/memory 24.

Figure 2A:
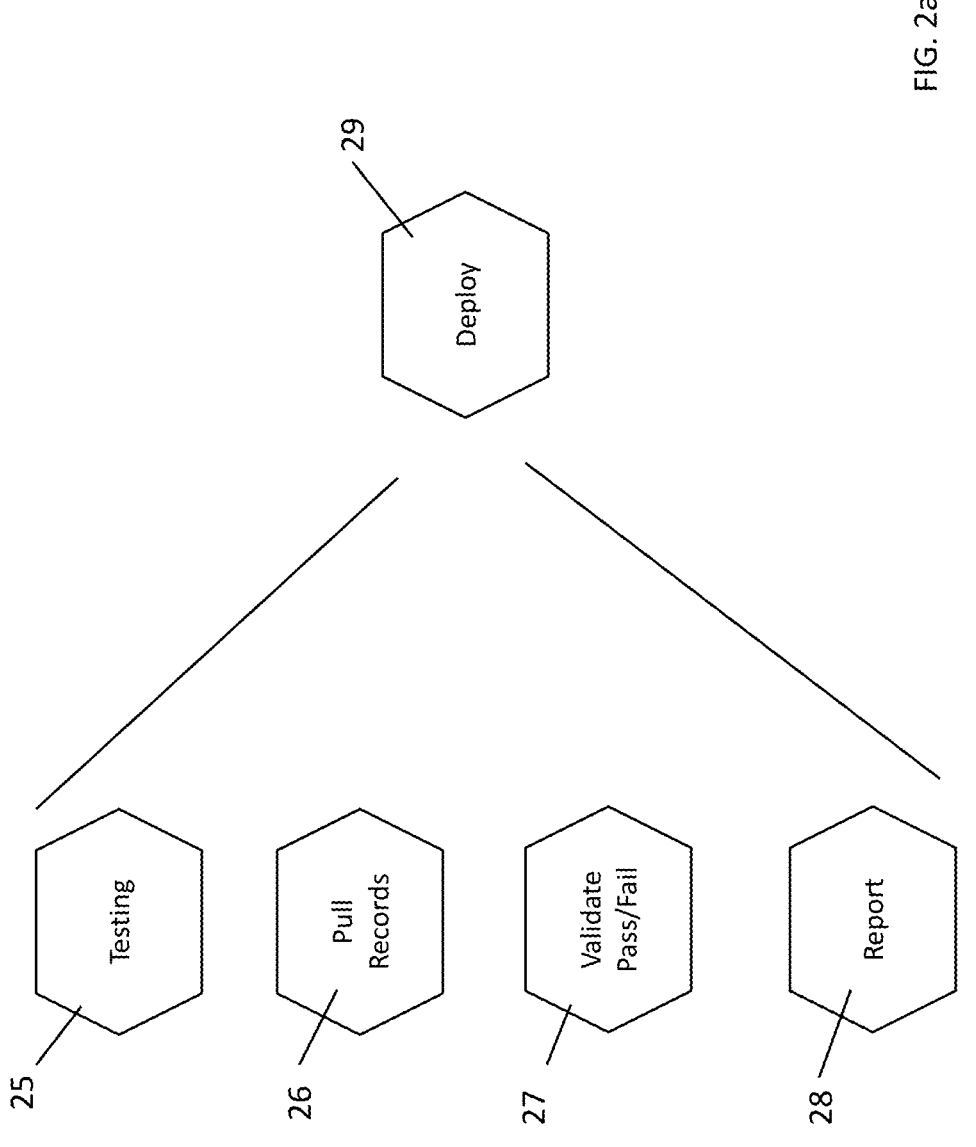
FIG. 2*a* illustrates an exemplary process flow from test to deployment in accordance with the present disclosure.

With reference to FIG. 2*a*, there is shown an exemplary process flow indicating the steps to be taken prior to deployment of a new cell site or cell sector as the deployment relates to communication with PSAPs such as PSAP A 19 or PSAP B 18. The first step is testing 25 during which actual calls are placed and tracked through the system from the user device 16 to a simulated PSAP destination. The simulated PSAP destination may be at an actual PSAP but the call is not treated as a live emergency call. At 26, the call detail records of the test call(s) are pulled and analyzed. At 27, the results are validated, and the test is deemed to have passed or failed. At 28, the records and results of validation are distributed in a report and rolled up in a summary report. The report may be in the form of a text message or email message to one or more personnel involved in the test. Once the steps set forth above are successfully completed, the cell site or cell sector may be deployed to active status having validated that emergency calls will be routed to the correct PSAP.

Figure 2B:
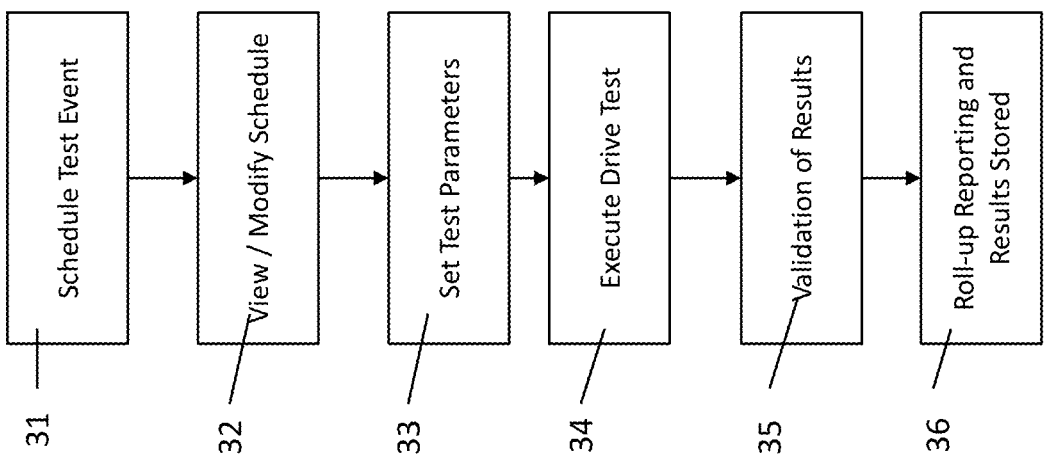
FIG. 2*b* illustrates an exemplary method of operation of the present disclosure.

With reference to FIG. 2*b*, there is shown an exemplary flow diagram 30 which shows the steps outlined with respect to FIG. 2*a* as they may be implemented by a processor executing instructions stored in computer memory. The steps shown include a scheduling of test events at 21. At 32, the option to view and modify test schedules is presented. At 33, test parameters are set. The test parameters may include, for example, class of service, the site and sector being tested, the frequency bands being tested, RF type, a cell global identity (CGI), which is a unique identifier for a cell site, distance and location, and any other parameters that may be useful to determine whether a call placed using a particular cell tower and cell sector is processed appropriately to be routed to a correct PSAP destination.

Continuing with FIG. 2*b*, the process continues at 34 in which a test drive is dispatched to initiate the test calls. The test drive location is determined based on the relative position of the cell site and cell sector to be tested. The call may be initiated by an operator of the vehicle or it may be initiated remotely upon command of the validation test server 20. At 35, the test results are validated, and a pass/fail grade is determined. At 36, individual reports and rollup summary reports are generated and distributed. Additionally, results are stored in historical database 22 for future reference.

Figure 2C:
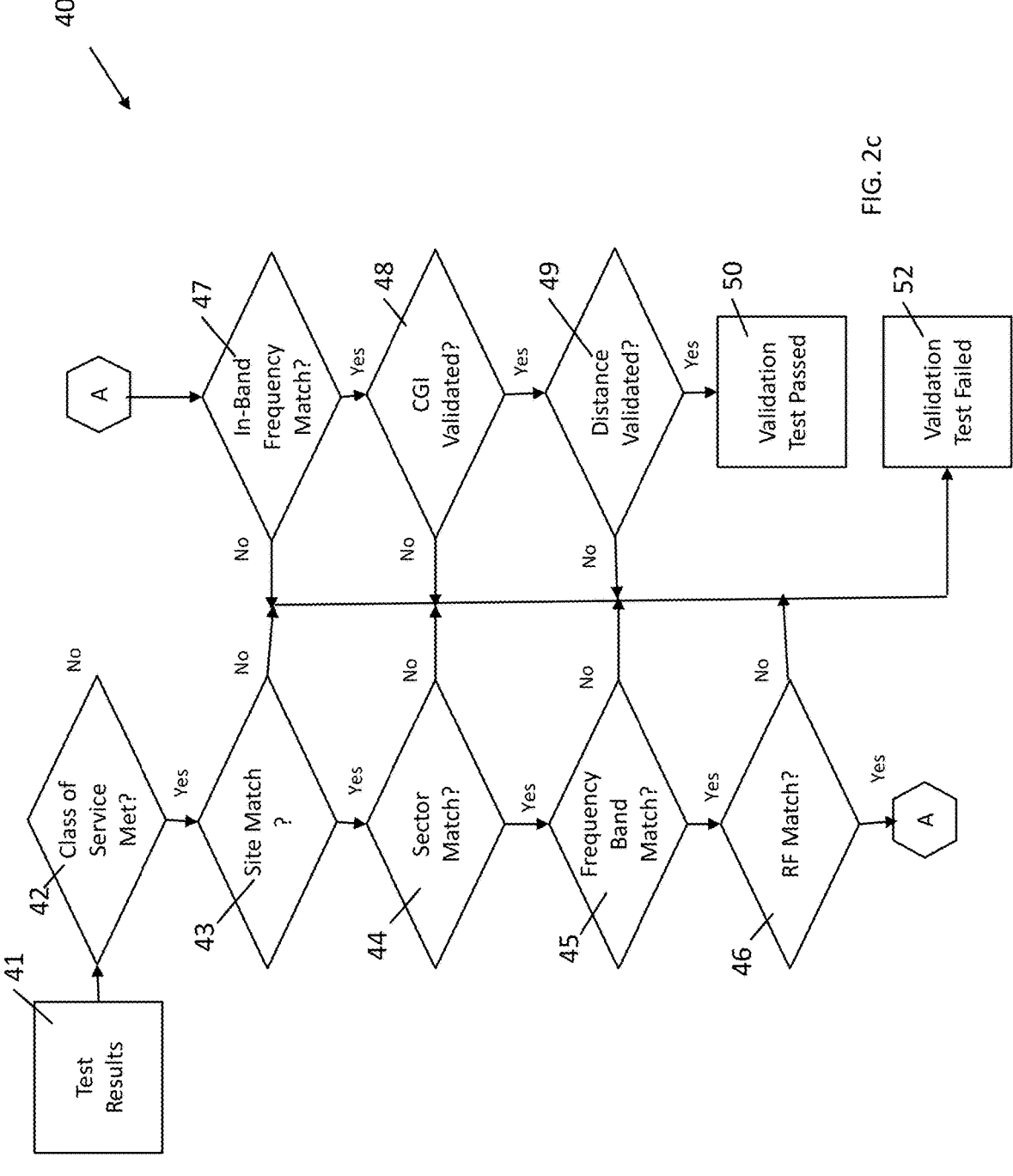
FIG. 2*c* illustrates an exemplary method in which test results are validated to arrive at a pass/fail criterion.

With reference to FIG. 2*c*, there is shown an exemplary flow diagram 40 showing the validation of the various parameters included in the validation test. At 41, the test results from call detail reports are fed into the validation tool. At 42, it is determined if the class of service parameters have been successfully met. At 43, it is determined if the cellular site parameters have been successfully met. At 44, it is determined if the cellular sector parameters have been successfully met. At 43 and 44 combined, the determination is made as to whether the validation test call communicate through the correct cell tower and the correct cell sector. At 45, it is determined whether the frequency band used was correct. At 46, it is determined whether the RF protocols were verified to be correct. At 47, it is determined whether the in-band frequency is correct. AT 48, it is determined whether the CGI was validated. At 49, it is determined if the distance was successfully validated. It the determination was affirmative in the above steps 42-49, the validation test will be deemed to have passed at 50. If the determination was negative for any of steps 42-49, the validation test will be deemed to have failed at 51.

Figure 3:
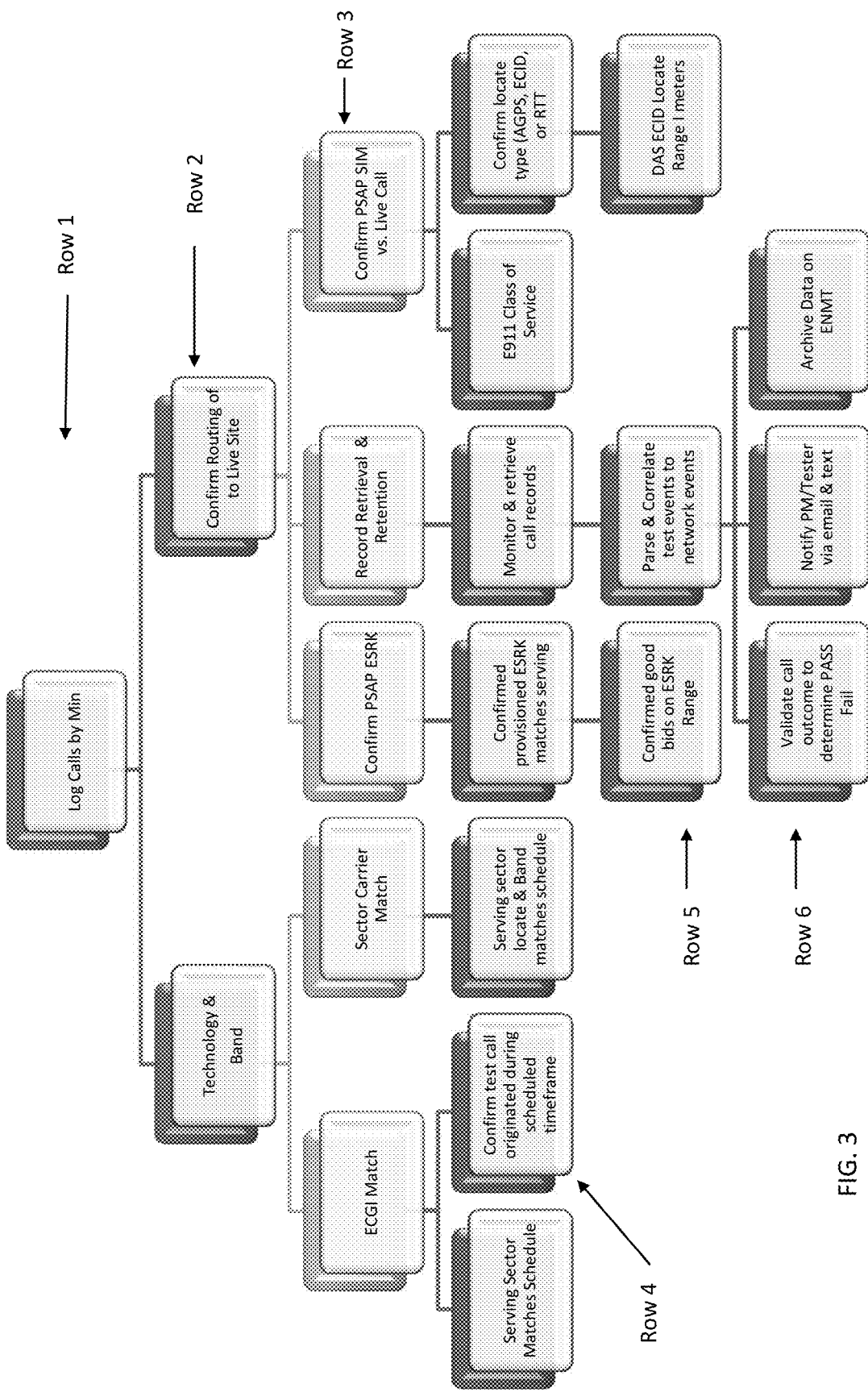
FIG. 3 illustrates an exemplary logic diagram of the system and method of the present disclosure.

With reference to FIG. 3, there is shown an exemplary logic diagram illustrating the test parameters and the validation thereof. At the top of the diagram, row 1 shows that the test calls will be logged, which in this example, will be logged by the schedule date and time and the duration of the test call logged in minutes. Row 2 illustrates two primary parameters to be validated, the RF technology and frequency bands, and the routing functionality from the caller to the PSAP. Following the left branch of the tree in Row 3, parameters such as ECGI match and sector carrier match are shown. Following the right branch of the tree in Row 3, parameters associated with the routing to the PSAP are shown. Rows 4 and 5 show the parameters as they are validated, and Row 6 shows the results of the validation test, including the pass/fail designation, the notification of the tester and other personnel of the results, which notification may, for example, include text and/or email notifications, and the archival of data in historical database 20 for future reference.

Figure 4A:
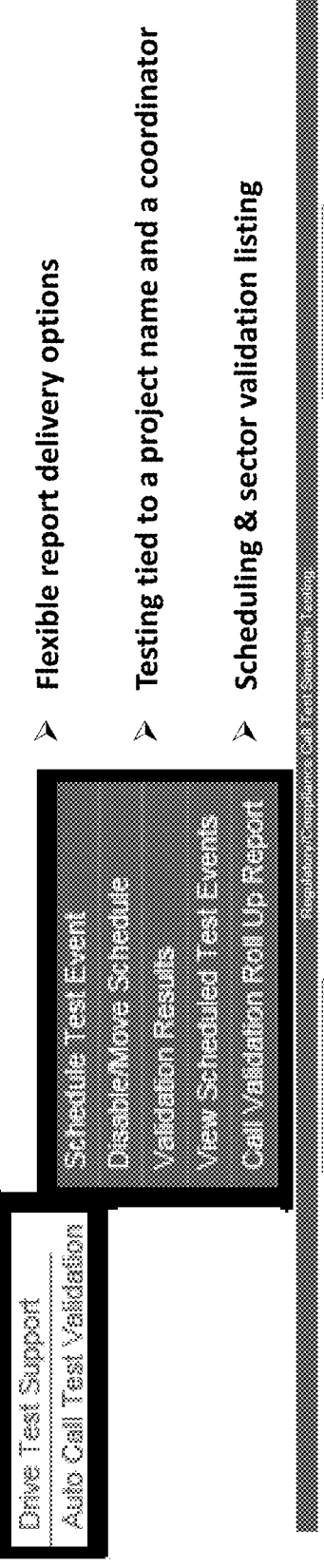
FIG. 4*a* illustrates an exemplary screen shot of an ENMT scheduling graphical user interface.
Figure 4A:
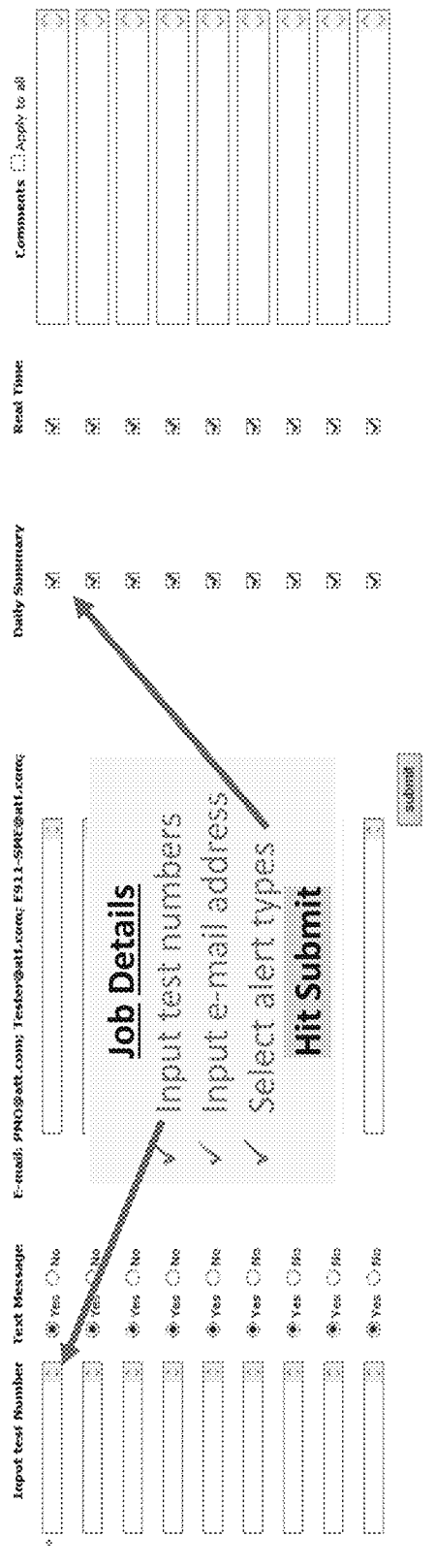

With reference to FIGS. 4*a* through 4*e*, there is shown exemplary screen shots (with test data redacted) that illustrates the operation of the system from the network perspective as controlled by a user. FIG. 4*a* shows a test scheduler interface which may, for example, include a drive test to support and an automatic call test validation function. Using this screen, a user may elect to schedule tests or modify tests, validate the results, view upcoming tests, and review validation test results and roll-up reports.

Figure 4B:
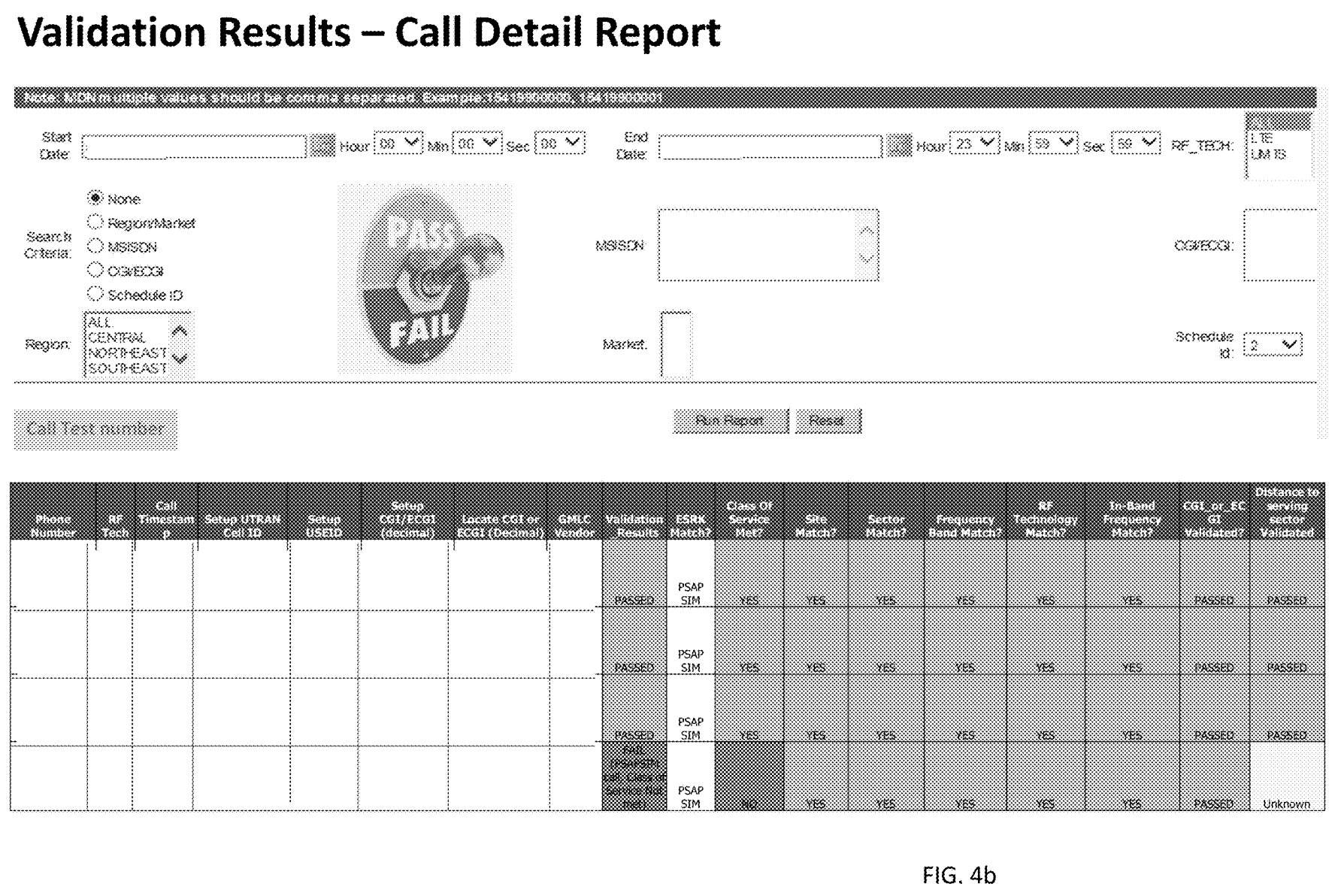
Figure 4C:
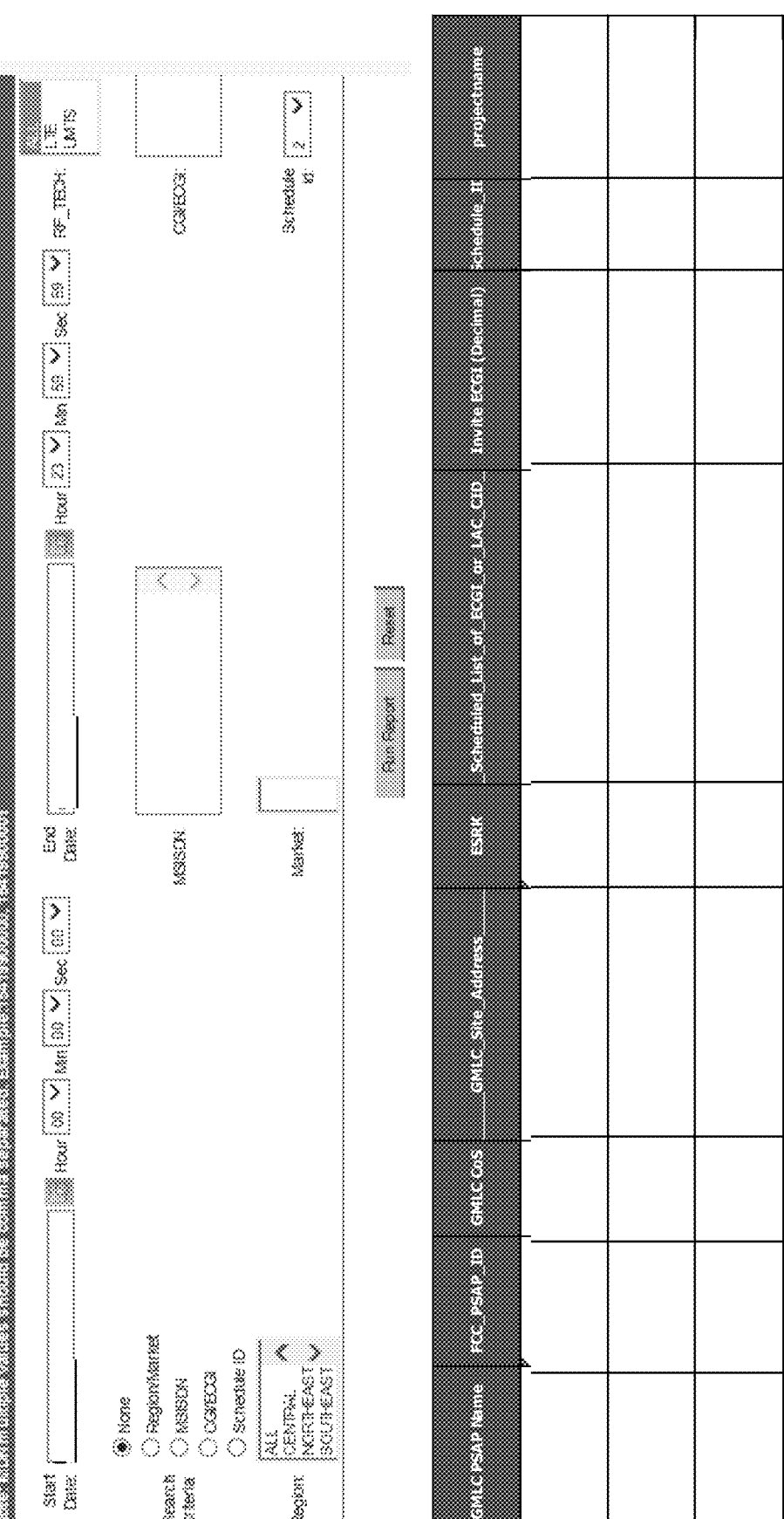
FIG. 4*c* illustrates an exemplary screen shot which is a continuation of the screen shot in FIG. 4*b*.

FIGS. 4*b* and 4*c* illustrate exemplary screen shots of call detail reports which may, for example, show graphically whether the tests passed or failed overall, as well as a detailed report as to which of the individual test parameters passed or failed. FIG. 4*d* shows an exemplary screen shot of the details of a scheduled test event.

Figure 4E:
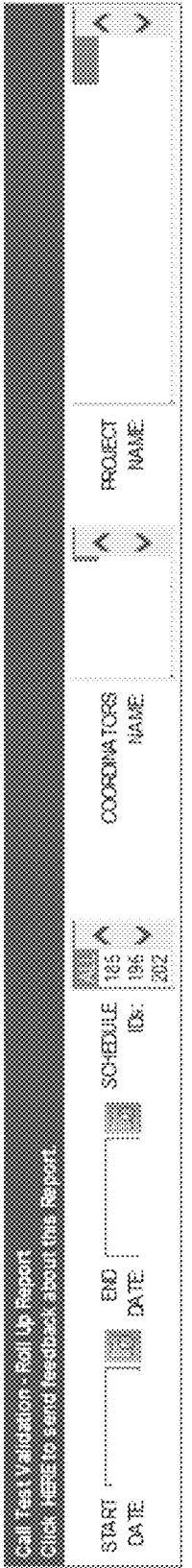
FIG. 4*e* illustrates an exemplary screen shot of a rollup summary report.

Finally, FIG. 4*e* illustrates an exemplary screen shot of a rollup summary report which includes various test events, dates, times, project names, coordinators, contact information and validation results.

Figure 5:
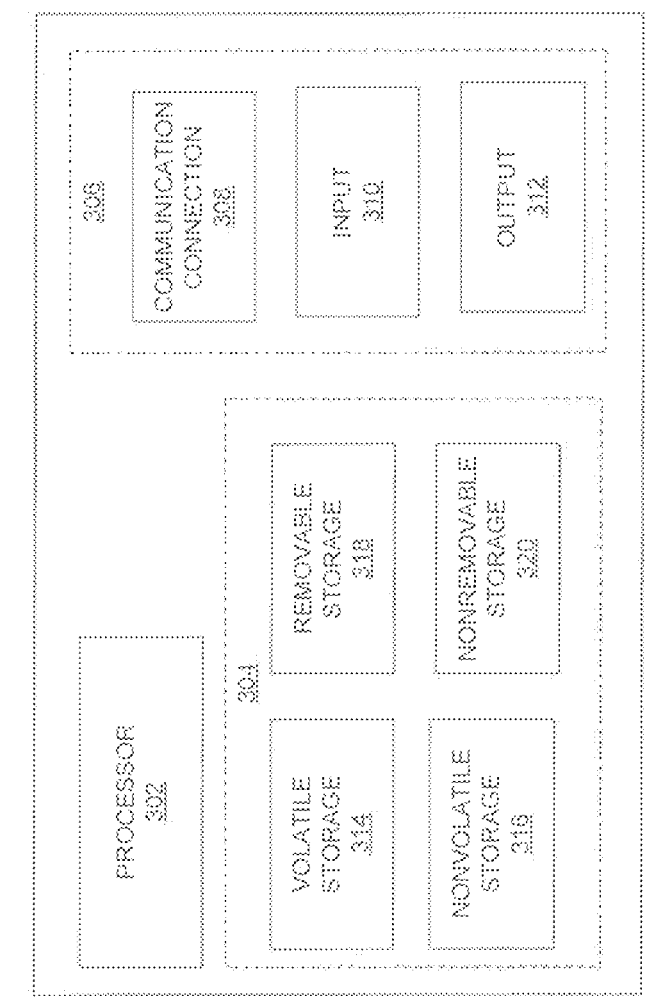
FIG. 5 illustrates a schematic of an exemplary network device.

Network Description. FIG. 5 is a block diagram of network device 300 that may be connected to the network described in FIG. 1 or which may be a component of such a network. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
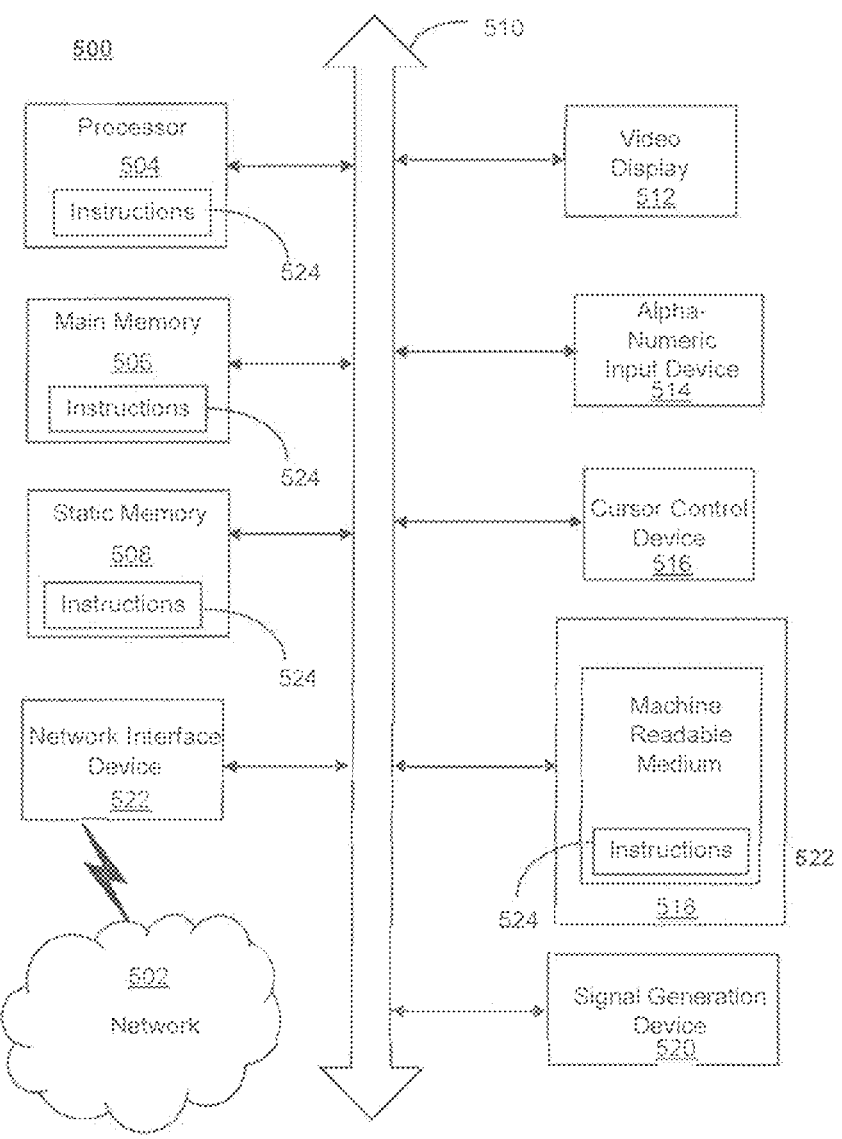
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, server 112, mobile device 101, in 102, MME 103, and other devices of FIG. 1 and FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, internet of things (IOT) device (e.g., thermostat, sensor, or other machine-to-machine device), or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
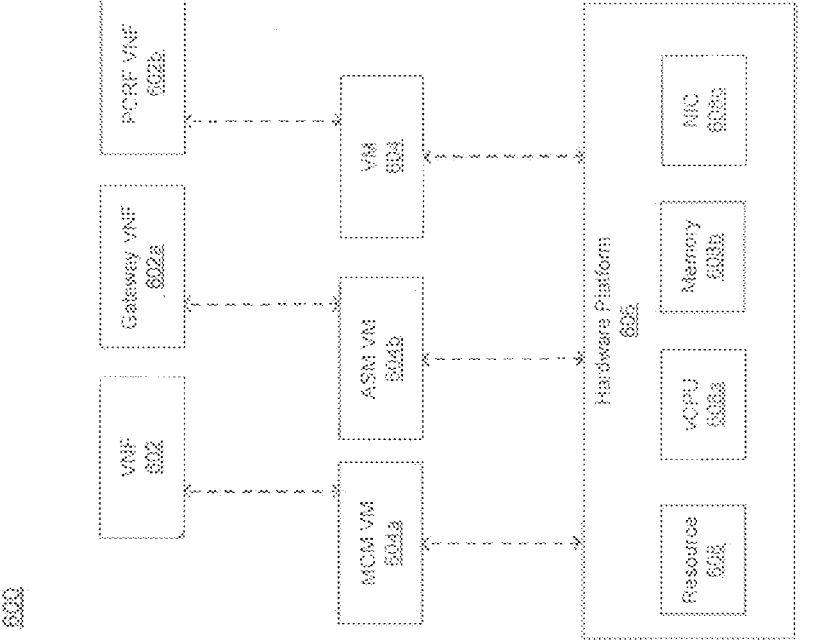
FIG. 7 is a representation of an exemplary network.

FIG. 7 is a representation of an exemplary network 600. Network 600 (e.g., network 111) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 7 illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 7 illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 8:
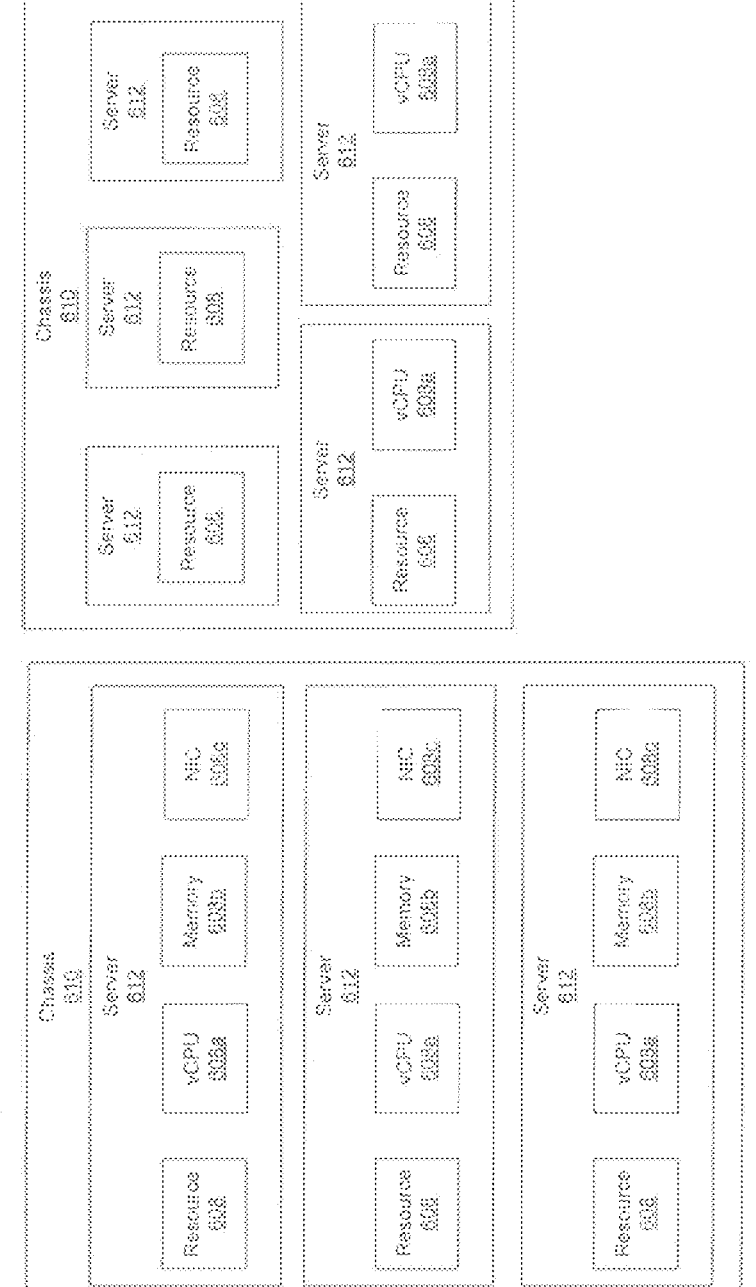
FIG. 8 is a representation of an exemplary hardware platform for a network.

While FIG. 7 illustrates resources 608 as collectively contained in hardware platform 606, the configuration of hardware platform 606 may isolate, for example, certain memory 608c from other memory 608c. FIG. 8 provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally, or alternatively, chasses 610 may be communicatively coupled together (not shown) in any combination or arrangement.

The characteristics of each chassis 610 and each server 612 may differ. For example, FIG. 8 illustrates that the number of servers 612 within two chasses 610 may vary. Additionally, or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally, or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602*b* may require two VMs 604 instantiated on the same server 612. (Assume, for this example, that no affinity or anti-affinity rules restrict whether VMs 604 for PCRF VNF 602*b* may or must be instantiated on the same or different server 612 than VMs 604 for gateway VNF 602*a*.) In this example, each of two servers 612 may have sufficient resources 608 to support 10 VMs 604. To implement sessions using these two servers 612, first server 612 may be instantiated with 10 VMs 604 to support two instantiations of gateway VNF 602*a*, and second server 612 may be instantiated with 9 VMs: five VMs 604 to support one instantiation of gateway VNF 602*a* and four VMs 604 to support two instantiations of PCRF VNF 602*b*. This may leave the remaining resources 608 that could have supported the tenth VM 604 on second server 612 unused (and unusable for an instantiation of either a gateway VNF 602*a* or a PCRF VNF 602*b*). Alternatively, first server 612 may be instantiated with 10 VMs 604 for two instantiations of gateway VNF 602*a* and second server 612 may be instantiated with 10 VMs 604 for five instantiations of PCRF VNF 602*b*, using all available resources 608 to maximize the number of VMs 604 instantiated.

Consider, further, how many sessions each gateway VNF 602*a* and each PCRF VNF 602*b* may support. This may factor into which assignment of resources 608 is more efficient. For example, consider if each gateway VNF 602*a* supports two million sessions, and if each PCRF VNF 602*b* supports three million sessions. For the first configuration—three total gateway VNFs 602*a* (which satisfy the gateway requirement for six million sessions) and two total PCRF VNFs 602*b* (which satisfy the PCRF requirement for six million sessions)—would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g., LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile and nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

In view of the foregoing, this disclosure provides a practical application that builds an automated system for scheduling and validating tests to ensure that cell sites/cell sectors are properly provisioned to route calls to the appropriate PSAP. As such, the state of the technology is advanced as such techniques may reduce the latency between the test and validation by up to five days.

While the disclosure has been described in relation to a generic network, it will be understood that the systems and methods disclosed herein may be deployed in both cellular networks and information technology infrastructure and support current and future use cases. Moreover, the architecture may also be used by carrier or third-party vendors to augment networks on the edge.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g., LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. An emergency test call management system comprising:

a processing system including a processor; and
    a memory that stores executable instructions that, when executed by the processing system facilitate performance of operations, the operations comprising:
    receiving, through a user interface and from a testing device, test parameters for a test call configured for testing connectivity between a public safety access point and a cellular network, wherein the test parameters include: a parameter pertaining to a radio frequency protocol, a parameter pertaining to distance, one of a plurality of sectors to be tested, and one of a frequency band for the test call, an emergency class of service for the test call, or both the frequency band for the test call and the emergency class of service for the test call;
    receiving test data from a base station at a conclusion of the test call;
    evaluating the test data based on the test parameters; and
    generating a report based on the evaluating the test data,
    wherein the testing device is associated with a vehicle,
    wherein the test call is initiated remotely from the vehicle upon a command of a validation test server, and
    wherein the test call is initiated at a location that is based on a relative position of a cell site and the one of the plurality of sectors to be tested.

2. The emergency test call management system of claim 1, wherein the test parameters include a specified base station and a specified cell sector within the base station, and wherein the evaluating the test data compares an actual base station and an actual cell sector that carried the test call to the specified base station and the specified cell sector.

3. The emergency test call management system of claim 1, wherein the test parameters further include a routing path to the public safety access point.

4. The emergency test call management system of claim 1, wherein the operations further include:
causing the test call to be initiated.

5. The emergency test call management system of claim 1, wherein the operations further include:
retrieving location data for the test call and confirming that the location data was reported to the public safety access point.

6. The emergency test call management system of claim 1, wherein the operations further include providing driving instructions for the vehicle.

7. A method comprising:
acquiring, by a processing system including a processor, call detail data associated with a test call from a user device to a public safety access point, in which the call detail data includes an identification of an actual base station site and an actual base station sector used for the test call, and the public safety access point receiving the test call;

determining, by the processing system, whether the call detail data matches test call parameters received from a testing device, wherein the test call parameters identify: a parameter pertaining to a radio frequency protocol, a parameter pertaining to distance, a planned base station site, a planned base station sector, and one of a frequency band for the test call, an emergency class of service for the test call or both the frequency band for the test call and the emergency class of service for the test call; and generating, by the processing system, a pass or fail determination based on the determining whether the call detail data matches the test call parameters,
wherein the testing device is associated with a vehicle,
wherein the test call is initiated remotely from the vehicle upon a command of a validation test server, and
wherein the test call is initiated at a location that is based on a relative position of a cell site and the planned base station sector.

8. The method of claim 7, further comprising:
determining, by the processing system, whether the location of the test call was reported to the public safety access point.

9. The method of claim 8, wherein the location of the test call was determined within a predetermined range.

10. The method of claim 8, wherein the pass or fail determination is sent via one of a text message or email.

11. A non-transitory, machine readable medium comprising executable instructions, which, when executed on a processing system including a processor, facilitate performance of operations, the operations comprising:
collecting call detail data associated with a test call from a user device to a public safety access point, in which the call detail data includes an identification of an actual base station site and an actual base station sector used for the test call and the public safety access point receiving the test call, and wherein the actual base station site collects the call detail data;
determining whether the call detail data matches test call parameters identifying: a parameter pertaining to a radio frequency protocol, a parameter pertaining to distance, a planned base station site, a planned base station sector, and one of a frequency band for the test call, an emergency class of service for the test call or both the frequency band for the test call and the emergency class of service for the test call; and
generating a pass or fail determination based on the determining whether the call detail data matches the test call parameters,
wherein the test call parameters are received from a testing device,
wherein the testing device is associated with a vehicle,
wherein the test call is initiated remotely from the vehicle upon a command of a validation test server, and
wherein the test call is initiated at a location that is based on a relative position of a cell site and the planned base station sector.

12. The non-transitory, machine readable medium of claim 11, wherein the operations further comprise:
receiving, from a user interface, scheduling data and the test call parameters relating to the test call.

13. The non-transitory, machine readable medium of claim 11, wherein the operations further comprise:
generating a user interface wherein the user interface includes a scheduling component, a call detail report component, and a validation component.

14. The non-transitory, machine readable medium of claim 13, wherein the validation component is color-coded to indicate the pass or fail determination visually.

15. The non-transitory, machine readable medium of claim 11, wherein the operations further comprise:

scheduling a plurality of test calls; and receiving, from a user interface, scheduling data for the plurality of test calls, test call parameters relating to each of the plurality of test calls.

16. The non-transitory, machine readable medium of claim 15, wherein the operations further comprise:

generating validation results and transmitting the validation results to the user interface.

17. The non-transitory, machine readable medium of claim 16, wherein the pass or fail determination is conveyed via a text message or an email communication.

18. The non-transitory, machine readable medium of claim 16, wherein the operations further comprise:

generating a roll-up report containing the validation results for the plurality of test calls.

19. The non-transitory, machine readable medium of claim 16, wherein the operations further comprise:

initiating test support for each of the plurality of test calls.

20. The non-transitory, machine readable medium of claim 11, wherein the pass or fail determination is color-coded to indicate the pass or fail determination visually.

\* \* \* \* \*